US010430868B2

(12) United States Patent
Nijim et al.

(10) Patent No.: US 10,430,868 B2
(45) Date of Patent: Oct. 1, 2019

(54) CONTENT PURCHASES AND RIGHTS STORAGE AND ENTITLEMENTS

(75) Inventors: Yousef Wasef Nijim, Roswell, GA (US); Francisco Gonzalez, Atlanta, GA (US); Terry Douglas Lee, Lawrenceville, GA (US); Charlotte Lee McLure, Alpharetta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 391 days.

(21) Appl. No.: 13/048,216

(22) Filed: Mar. 15, 2011

(65) Prior Publication Data

US 2011/0314378 A1    Dec. 22, 2011

Related U.S. Application Data

(60) Provisional application No. 61/356,431, filed on Jun. 18, 2010.

(51) Int. Cl.
*G06Q 30/06* (2012.01)
*G06Q 30/04* (2012.01)
*G06F 16/958* (2019.01)

(52) U.S. Cl.
CPC ....... *G06Q 30/0645* (2013.01); *G06F 16/958* (2019.01); *G06Q 30/04* (2013.01); *G06Q 30/06* (2013.01)

(58) Field of Classification Search
CPC ..... H04L 65/4084; H04L 67/14; G06F 21/10; G06F 17/30867; G06F 2221/0753; H04N 21/47202; H04N 21/482; H04N 21/2747; H04N 21/2225; H04N 21/2547

See application file for complete search history.

(56) References Cited

U.S. PATENT DOCUMENTS

| | | | | |
|---|---|---|---|---|
| 6,725,303 B1* | 4/2004 | Hoguta | ............... | H04Q 3/0016 709/227 |
| 6,834,285 B1* | 12/2004 | Boris | ..................... | G06Q 10/10 |
| 7,103,906 B1* | 9/2006 | Katz | .................. | H04N 7/17318 348/E7.071 |
| 7,162,697 B2* | 1/2007 | Markel | ................. | H04N 7/088 348/E5.006 |
| 7,647,278 B1* | 1/2010 | Foth | ...................... | G06Q 20/10 380/270 |
| 8,346,807 B1* | 1/2013 | Diamond | ............... | G06F 21/10 707/781 |
| 8,667,545 B1* | 3/2014 | Croak | ............. | H04N 21/21815 725/86 |
| 8,893,299 B1* | 11/2014 | Diamond | ............... | G06F 21/10 705/51 |
| 2002/0049717 A1* | 4/2002 | Routtenberg | ......... | H04H 60/21 |

(Continued)

*Primary Examiner* — Tadesse Hailu
(74) *Attorney, Agent, or Firm* — Merchant & Gould P.C.

(57) ABSTRACT

Storing asset ID and entitlement data of purchased and rented media from various sources in a media contents account and allowing access to the stored asset ID and entitlement data from various devices is provided. A user may access a media contents account via a network-connected device to view his/her purchased and rented media. The network-connected device may be a device that has been registered with the account. A user may select a title of purchased or rented media to stream or download. Upon verification of entitlement rights, the media may be streamed or downloaded to the user.

21 Claims, 5 Drawing Sheets

(56) References Cited

U.S. PATENT DOCUMENTS

| | | | |
|---|---|---|---|
| 2002/0091643 A1* | 7/2002 | Okamoto | G06Q 30/06 705/53 |
| 2003/0217007 A1* | 11/2003 | Fukushima et al. | 705/51 |
| 2004/0133918 A1* | 7/2004 | Danker | H04N 7/17318 725/100 |
| 2005/0091164 A1* | 4/2005 | Varble | G06F 21/10 705/52 |
| 2005/0177624 A1* | 8/2005 | Oswald | H04L 67/104 709/219 |
| 2005/0177853 A1* | 8/2005 | Williams et al. | 725/81 |
| 2006/0015580 A1* | 1/2006 | Gabriel | H04N 7/17309 709/219 |
| 2006/0053079 A1* | 3/2006 | Edmonson | G06F 21/10 705/59 |
| 2006/0077461 A1* | 4/2006 | Camara et al. | 358/1.15 |
| 2006/0095339 A1* | 5/2006 | Hayashi | G06Q 30/06 705/26.8 |
| 2006/0095792 A1* | 5/2006 | Hurtado et al. | 713/189 |
| 2006/0291506 A1* | 12/2006 | Cain | H04N 21/2547 370/486 |
| 2007/0094691 A1* | 4/2007 | Gazdzinski | H04N 7/17318 725/62 |
| 2007/0203841 A1* | 8/2007 | Maes | H04L 63/08 705/52 |
| 2007/0220575 A1* | 9/2007 | Cooper | H04N 7/1675 725/118 |
| 2008/0027819 A1* | 1/2008 | Ruckart | G06F 21/10 705/26.81 |
| 2008/0071617 A1* | 3/2008 | Ware | G06Q 30/00 705/14.26 |
| 2008/0127255 A1* | 5/2008 | Ress et al. | 725/38 |
| 2008/0155613 A1* | 6/2008 | Benya | H04N 7/17318 725/89 |
| 2008/0162450 A1* | 7/2008 | McIntyre et al. | 707/5 |
| 2008/0263603 A1* | 10/2008 | Murray et al. | 725/87 |
| 2008/0319914 A1* | 12/2008 | Carrott | 705/75 |
| 2009/0037963 A1* | 2/2009 | Murray et al. | 725/92 |
| 2009/0037964 A1* | 2/2009 | Murray et al. | 725/92 |
| 2009/0063301 A1* | 3/2009 | Ward | G06Q 30/06 705/26.8 |
| 2009/0178093 A1* | 7/2009 | Mitsuji | H04N 7/1675 725/104 |
| 2009/0234735 A1* | 9/2009 | Maurer | G06F 21/10 705/14.49 |
| 2009/0260064 A1* | 10/2009 | McDowell | G06F 21/10 726/4 |
| 2010/0017424 A1* | 1/2010 | Hughes | 707/101 |
| 2010/0017831 A1* | 1/2010 | Newell | H04N 7/17318 725/104 |
| 2010/0043077 A1 | 2/2010 | Robert | 726/27 |
| 2010/0106672 A1* | 4/2010 | Robson et al. | 706/50 |
| 2010/0107049 A1* | 4/2010 | Marston | 715/222 |
| 2010/0180308 A1* | 7/2010 | Howcroft | G06Q 30/02 725/53 |
| 2010/0269146 A1* | 10/2010 | Britt | 725/110 |
| 2010/0299264 A1 | 11/2010 | Berger et al. | 705/59 |
| 2010/0319017 A1* | 12/2010 | Cook | H04N 5/907 725/31 |
| 2011/0055934 A1* | 3/2011 | Koka | G06F 21/10 726/28 |
| 2011/0118858 A1* | 5/2011 | Rottler | H04L 63/08 700/94 |
| 2011/0154198 A1* | 6/2011 | Bachman | G06F 17/30026 715/704 |
| 2011/0202945 A1* | 8/2011 | Pickelsimer | H04N 5/44543 725/1 |
| 2011/0225417 A1* | 9/2011 | Maharajh | G06F 21/10 713/150 |
| 2011/0231273 A1* | 9/2011 | Buchheit | G06Q 20/12 705/26.1 |
| 2011/0289533 A1* | 11/2011 | White | G06F 17/3002 725/46 |
| 2012/0179639 A1* | 7/2012 | Robson et al. | 706/50 |
| 2013/0132232 A1* | 5/2013 | Pestoni | H04L 63/10 705/26.25 |
| 2013/0152174 A1* | 6/2013 | Raley | G06F 21/31 726/4 |
| 2013/0211971 A1* | 8/2013 | Lin | G06F 21/10 705/27.1 |

* cited by examiner

CONTENT PURCHASES AND RIGHTS STORAGE AND ENTITLEMENTS

CROSS REFERENCE TO RELATED APPLICATIONS

The present application claims priority to U.S. Provisional Patent Application No. 61/356,431 filed Jun. 18, 2010, which is hereby incorporated by reference.

BACKGROUND

In today's digital age, many users use an on demand (OD) system to select and view or listen to media content. Media content may be streamed through various devices, such as set-top boxes (STB), computers, Internet televisions, smart-phones, gaming consoles, or other types of network-connected devices. Many media content providers offer OD streaming whereby a user purchases a piece of media content, and the content is available to the user for viewing for a limited period of time (i.e., rental digital content), or for an indefinite period of time (i.e., purchased digital content). Media content providers may offer OD downloading whereby a user purchases a piece of media content, and the content is available for downloading onto a designated number of authorized devices.

In current systems, if a user purchases a piece of media content from a content provider, an account may be provided by the content provider for allowing the user to view content purchased from the content provider, to select purchased content to watch, to initiate a download, and to view available licenses for his/her content. While a media account may be useful for managing media content purchased from a given content provider, oftentimes, users purchase content from a plurality of content providers via various platforms (e.g., mobile, web, STB, etc.) and/or purchase content from one content provider, but want to be able to access the content via various platforms.

Thus, there is a need for methods, systems and computer readable media for storing entitlements associated with a user's OD media rentals and purchases so that the rented and purchased media may be available to the user from various platforms on various devices. It is with respect to these and other considerations that the present invention has been made.

SUMMARY

The above and other problems are solved by providing for storing asset identification (ID) and entitlement data of purchased and rented media from various sources and for allowing access to the stored asset ID and entitlement data form various devices.

Media content, which may include, but is not limited to, video, audio, image, and data files, may be purchased or rented from various media providers. Embodiments of the present invention provide for a media contents folder/account that may store asset ID and entitlement data of purchased and rented media from various media providers. The stored asset ID and entitlement data may be accessed by various user devices, such as a smart phone, a computer, Internet television (TV), a set-top box (STB), a game console, a tablet computer, a BLU-RAY player, or other type of network-connected device. A user may access purchased and rented media content from any registered device regardless of where the media was purchased/rented or from what device the purchase/rental was made.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

As briefly described above, embodiments of the present invention are directed to allowing a user to purchase or rent on demand content from a plurality of platforms and to access the purchased content from a plurality of registered devices.

Embodiments of the present invention provide for a media contents folder/account for storing asset ID and entitlement data associated with purchased and rented media content. Media content may be purchased from a plurality of media providers via various platforms (e.g., web, mobile, set-top box). The web-based folder may be accessible to a user via various platforms and devices so that the user may have access to all his/her purchased and rented media from a single library.

According to embodiments, a user may allow for a communication of a purchase or rental of media from a media provider to a "My Contents" account. Asset ID and entitlement data may be provided to the account, where the data may be stored. A user may access his/her "My Contents" account via a network-connected device to view his/her purchased media. The network-connected device may be a device that has been registered with the account. A user may select a title of purchased or rented media from his/her "My Contents" folder to stream or download. Upon verification of entitlement rights, the media may be streamed or downloaded to the user.

Other embodiments provide for a "My Contents" folder to be available to a user through an On Demand menu. Available On Demand media may be displayed to the user through an On Demand menu. A determination may be made to identify if any of the content available through the On Demand menu is content that the user has previously purchased or rented and is stored in the user's "My Contents" folder. If there is media available that the user has previously purchased or rented, and if the rights and privileges allow for accessing it, the media content may be provided to the user free of charge.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Figure 1:
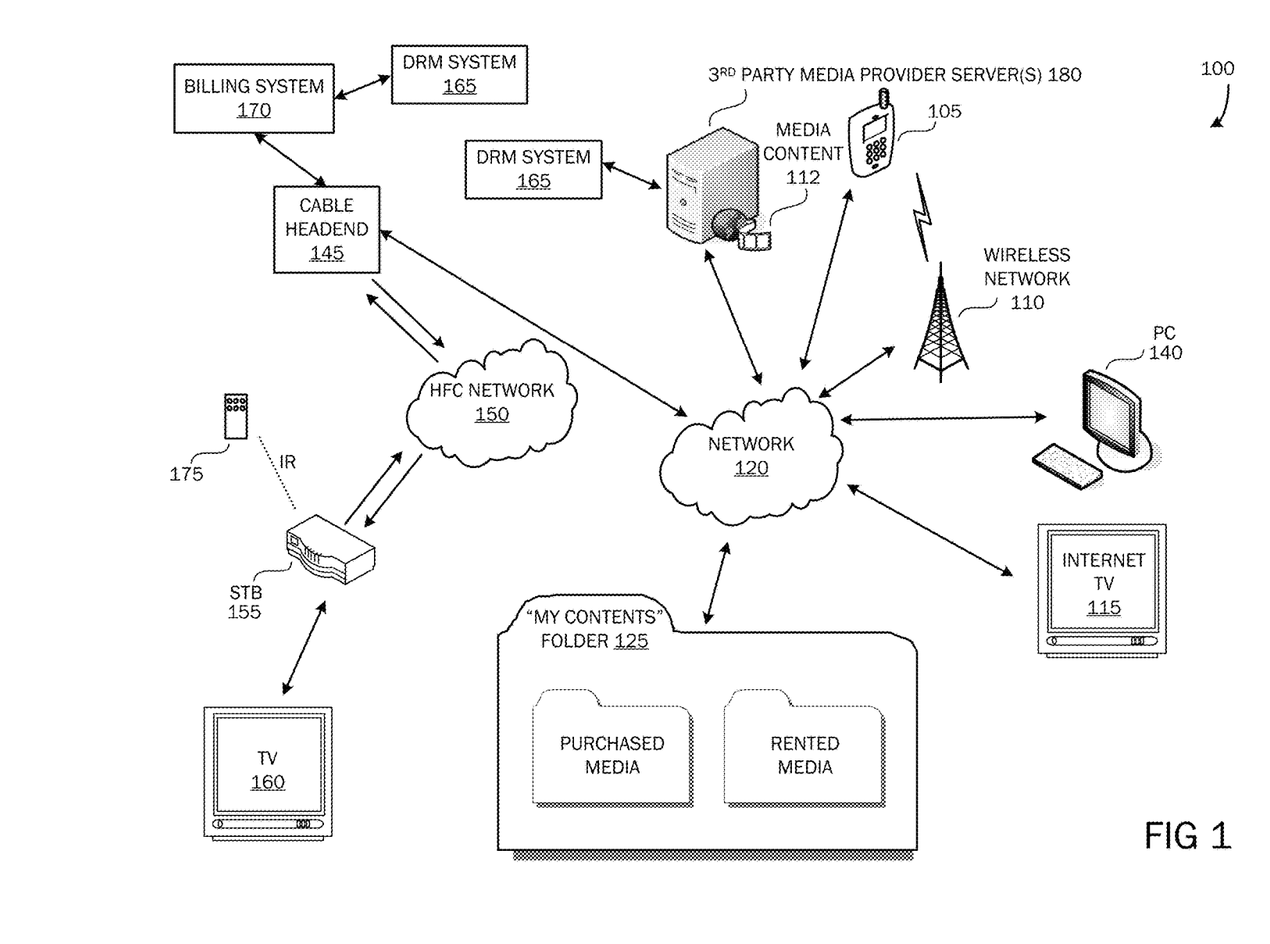
FIG. 1 is a block diagram illustrating an example system with which embodiments of the present invention may be implemented.

FIG. 1 is a block diagram illustrating an example system 100 with which embodiments of the present invention may be implemented. As illustrated in the example of FIG. 1, the system 100 includes various user devices which a user may use to purchase, download, and/or stream media content 112 including, but not limited to, a smart phone 105, a computer 140, Internet television (TV) 115, a set-top box (STB) 155, a game console, a tablet computer, a BLU-RAY player, or other type of network-connected device. The user devices 105, 140, 115, 155 may access media content 112 via various network interfaces such as a local area network (LAN), wide area network (e.g., Internet) 120, or other type of network. The network interface 120 may receive signals according to various technologies including, but not limited to, wireless network 110 technologies, hybrid fibre-coaxial (HFC) network 150 technologies, etc.

Media content 112 may be provided by a cable television (CATV) services or telephone services system (telco) services headend 145, by a VOD server connected to a CATV headend, or by various third party media provider servers 180, which may be computer systems storing video, audio, or other digital media content 112 for sending to users' devices 105, 140, 115, 155. Media content may include, but is not limited to, video, audio, image, and data files. For example, media content may include movies, music, photographs, electronic books, etc. Media content 112 may be streamed from an OD provider 145, 180, wherein the media content may be compressed and sent over a network 120, 150. The media content 112 may then be decompressed by a receiving device 105, 140, 115, 155 for display. Alternatively, media content 112 may be in the form of a media file that may be downloaded to a user's device 105, 140, 115, 155 to be played.

A media provider system 145, 180 may comprise data services, which may include a number of services operated by the services provider and which may include data on a given customer. Data services may include one or more of a billing system 170, an email system, a digital rights management system (e.g., license server) 165, and a customer information database. A digital rights management (DRM) system 165 may include information such as secure user names and passwords utilized by customers for access to network services or content. According to embodiments, the DRM system 165 may be an encryption/decryption management method for controlling a user's access to digital media. The DRM system 165 may offer security for purchases and other transactions, and may store entitlement data including, but not limited to, licenses or usage rights to digitally protected media, access permissions, keys to decrypt encrypted media content, and a list of device identifications associated with devices 105, 140, 115, 155 that are authorized to access digital media content.

According to some licenses for purchased or rented digital media, a user may be authorized to stream or download content by way of a predefined number of authorized devices 105, 140, 115, 155. Device identification data may be authenticated by a service and/or media content provider 145, 180. As mentioned, device identification and authentication data may be stored in a DRM system 165, but may alternatively be stored in a customer information database or in a media contents folder/account 125 as will be described below.

The data services systems comprising the data services may operate as separate data services systems, which communicate with a web services along a number of different communication paths and according to a number of different communication protocols. A web services system serving as a collection point for data requested from each of the disparate data services systems comprising the data services may be included.

An application server located at a cable headend 145 or at a third party media provider 180 may require customer profile data from one or more of the data services for preparation or update of a customer profile, and may pass a data query to the web services system. The web services system formulates a data query to each of the available data services systems for obtaining any available data for a given customer as identified by a set-top box identification associated with the customer. The web services system serves as an abstraction layer between the various data services systems and the application server. That is, the application server is not required to communicate with the disparate data services systems, nor is the application server required to understand the data structures or data types utilized by the disparate data services systems. The web services system is operative to communicate with each of the disparate data services systems for obtaining necessary customer profile data. The customer profile data obtained by the web services system is assembled and is returned to the application server for ultimate processing via a middleware layer.

The system 100 may comprise a web-based media contents folder/account, hereafter referred to as a "My Contents" folder 125, for storing entitlements of purchased and rented media content 112, including unique asset IDs associated with purchased/rented media content and a list of device identifications associated with devices 105, 140, 115, 155 that are authorized to access purchased/rented media content. A "My Contents" folder 125 may be accessible across various platforms including, but not limited to STB 155, web portal/PC 140, 115, and via mobile devices 105. Although the "My Contents" folder 125 is illustrated as a remote system, it may be integrated with a service provider headend 145 or billing system 170.

According to embodiments, a piece of media content 112 may be purchased or rented from a CATV service provider 145 or from a third party media provider 180 via a variety of platforms (e.g., STB 155, web-based 140,115, mobile 105). Entitlements of the purchased/rented media content 112 may be maintained in a "My Contents" folder 125 regardless of where it was purchased 145,180 or from what platform it was purchased/rented (e.g., mobile, web, STB). When a piece of media content 112 is purchased/rented from a content provider 145,180, the purchase/rental may be recorded and stored to allow unlimited access to the content from any available platform as allowed according to the entitlement data. According to embodiments, a "My Contents" folder 125 may comprise a subfolder for purchases and a subfolder for rentals.

According to some digital rights, a specified type and/or number of devices may be allowed by a media provider 145,180 to stream or download media content 112. A device 105,115,140,155 may be authorized by a given media provider before streaming or downloading of media 112 is allowed. A device may be identified via a unique identifier, such as a MAC address or an IP address. Upon authentication, device identification information associated with a user may be stored in a media provider database 145, billing system 170, or in the "My Contents" folder 125. According to embodiments, one or more devices 105, 115, 140, 155 may be associated with a "My Contents" folder 125. Device identification information may be entered manually by a user, may be automatically captured upon accessing the "My Contents" folder 125, or may be automatically captured upon purchasing a piece of media content 112 from a media content provider 145,180.

Purchased and rented media content 112 may have a unique asset ID by which the content may be identified, managed, and accessed. Entitlement data may be stored and maintained in a "My Contents" folder 125 based on the unique asset ID of the media content. A user may access purchased media content 112 as many times as allowed on his/her authorized devices 105, 140, 115, 155. For example, a user may purchase a movie A from online store A on the user's mobile phone 105, movie B from a VOD menu via the user's STB 155, and movie C from online store C via the user's personal computer 140. The asset IDs and entitlement data associated with movies A, B, and C may collectively be stored in the user's "My Contents" folder 125, and accessible from any of the user's registered devices 105,115,140, 155.

Embodiments of the present invention may include an automatic detection of purchased and rented media 112. A user may have an account with or purchase/rent media 112 from one or more media content providers 145,180. A user may wish to associate an account or folder associated with a media content provider 145,180 with a "My Contents" folder 125. Upon receiving access rights to share data from a media content provider 145,180 account with a "My Contents" folder 125, the "My Contents" folder may be automatically populated with unique asset ID and entitlement data of media content 112 purchased or rented from the media content provider 145, 180. According to other embodiments, a user may manually add media content 112 purchased/rented from a third party media provider 180 to a "My Contents" folder 125.

Other media content associated content may be provided and stored in a "My Contents" folder 125 such as poster arts of titles and extras such as cut scenes, reviews, etc. When allowed by a content provider 145,180, high level/personal metadata may be edited by a user. Metadata changes may be local to the user, may be added, but may not replace the metadata that is associated with the media content 112 (e.g., title, price, rating, crew, etc.).

Purchases and rentals may be updated and synchronized across the different platforms in real time. According to embodiments, bookmarks may be stored per user so that when a user views a piece of media content 112 from a "My Contents" folder 125, and the user presses STOP or when a PAUSE functionality times out, the user may access and resume watching the content from the point at which he/she stopped watching previously.

When a user accesses a "My Contents" folder 125 from a given device, for example, a STB 155, the user may be automatically provided with a format suitable to the platform. For example, if a user is trying to watch a movie 112 from a television 160, the user may be automatically provided with the highest format available (e.g., high-definition) unless the user decides to view a lower format version of the media.

According to embodiments, a "My Contents" folder 125 may be a category in an On Demand menu. If a piece of media content 112 has been purchased by a user, either though a CATV service provider 145 or via another third party provider 180, and the specified media content is available and listed in an On Demand menu, the media content may be selected by the user from the menu and accessed for no charge. That is, a record of the purchase or rental of the media content 112 and entitlement data will be stored in a "My Contents" folder 125. A communication of the purchase will allow the provider of the OD content 112 to provide a streaming of the content without charging the user again. If a purchased or rented media 112 is no longer available in an OD menu category, the user may still access the content through his/her "My Contents" folder 125. The media content 112 may be streamed or pushed to the user based on the requesting device 105,115,140,155.

When media content 112 is rented by a user, limited rights and licenses may be granted to the user. For example, the user may only be allowed to stream or download the rented content 112 to one authorized device 105,115,140,155, and may be available to the user for a limited time period (e.g., a specified number of days from the time of rental; or a specified amount of time from when the user starts viewing the rented media). Embodiments of the present invention provide for allowing a user to purchase rented media 112 both during the rental period and after the rental period has expired. According to embodiments, the user may purchase the media from the same provider 145,180 from which he/she rented the media, or alternatively, may purchase the media from another provider. The another provider may be a provider which has been associated with the user's "My Contents" folder 125 so that a communication of rental and purchase information and entitlement rights may be shared between billing systems 170. A purchase of media 112 may occur on the same device 105,115,140,155 the user rented the media, or alternatively may occur on another device associated with the user's "My Contents" folder 125. A discounted price may be provided to the user. For example, if a user chooses to purchase a rented movie 112 during the rental time period, the price to purchase the movie may be equal to the purchase price minus the rental fee already paid by the user. If the user chooses to purchase a piece of media content 112 after a rental time period has expired, a discount may be provided to the user according to a media provider's 145,180 business plan.

According to embodiments, various views of media titles may be provided, so that when a user accesses a "My Contents" folder 125, he/she may be able to sort his/her purchases and rentals via title, release date, price, ratings, etc. Additionally, a user may group media content 112 based on studio or content provider 145,180, based on genre, or by category (e.g., children, drama, horror, etc.).

According to another embodiment, media content 112 may be downloaded by a user, authenticated by service provider 145, and stored on a local or remote computer-readable storage medium. The entitlement data may be stored in a "My Contents" folder 125, wherein the user may access the downloaded content 112 from his/her various devices 105,115,140,155. For example, a user may purchase a DVD of a movie 112, authenticate the purchase of the movie, and download the content to a storage medium at a service provider headend 145. The user may want to watch the movie 112 on his/her Internet-connected television 115. He/she may access his "My Contents" folder 125, select the movie title, and have the content streamed to his/her Internet television 115.

Figure 2:
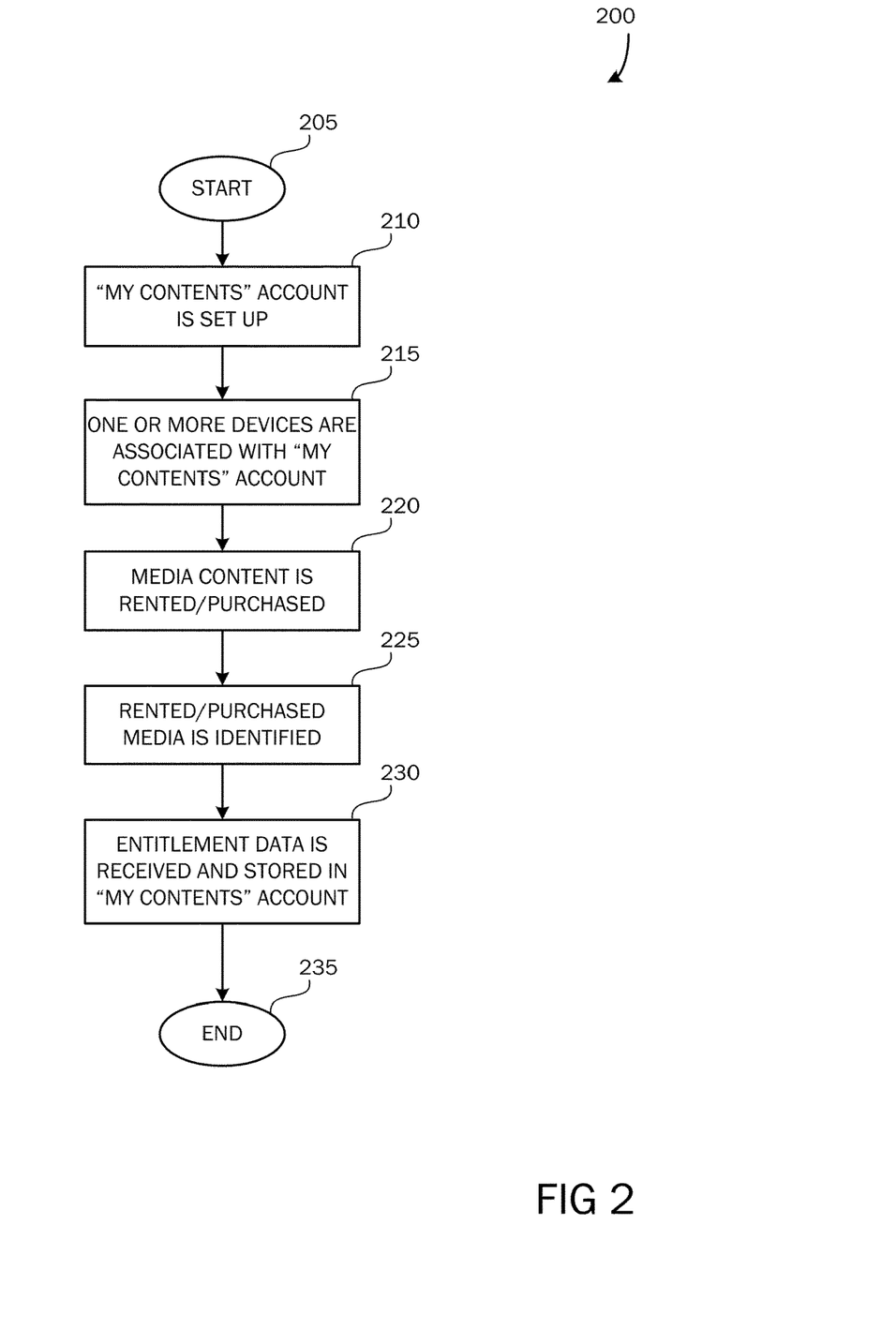
FIG. 2 is a flowchart illustrating an example method of receiving and storing asset ID and entitlement data associated with a purchase or rental of media content.

Having described a system architecture for embodiments of the present invention, FIG. 2 is a flow diagram illustrating a method for receiving and storing identification and entitlement data associated with purchased/rented media content 112 in a unified account 125 that may be accessed from various devices 105,115,140,155. The method starts at OPERATION 205 and proceeds to OPERATION 210 where a "My Contents" folder 125 is set up. According to embodiments, the "My Contents" folder 125 may be maintained by a media content provider 145,180, or alternatively may not be affiliated with a content provider system. Setting up a "My Contents" folder 125 may include entering credential data, such as a username and password.

At OPERATION 215, one or more user devices 105,115, 140,155 are associated with the "My Contents" folder 125. According to embodiments, a user device may be associated with a "My Contents" folder by manually entering a unique identification of a user device 105,115,140,155, by automatically capturing a unique identification of a user device upon accessing the "My Contents" folder 125, or by automatically capturing a unique identification of a user device upon purchasing/renting a piece of media content 112 from a media content provider 145,180.

At OPERATION 220, media content 112 may be purchased or rented. According to embodiments, media content may include, but is not limited to, video, audio, image, and data files. Media content 112 may be a piece of physical media, such as a DVD, CD, BLU-RAY, etc., or may be in a digital format that may be downloaded or streamed to a device 105,115,140,155. Media content 112 may be purchased or rented in a physical store, via a web-based media provider 180, or via an On Demand (OD) menu associated with a media services provider (e.g., CATV 145).

At OPERATION 225, the purchased or rented media 112 is identified. The media may be identified via a unique asset ID. According to embodiments, purchased or rented media 112 may be identified manually, wherein a user enters a unique asset ID associated with a piece of purchased/rented media 112 into his/her "My Contents" folder 125. Alternatively, purchased/rented media 112 may be automatically identified upon purchase/rental of the media if the media is purchased/rented via a networked device 105,115,140,155 associated with the user's "My Contents" folder 125. According to another embodiment as was described above, purchased/rented media 112 may be automatically identified upon purchase/rental of the media if the media is purchased/rented from a media provider 145,180 which has been associated with the user's "My Contents" folder 125.

Upon identification of purchased/rented media 112, entitlement data associated with the media may be received from the media provider 145,180 and stored in the user's "My Contents" folder 125. The method ends at OPERATION 235.

Figure 3:
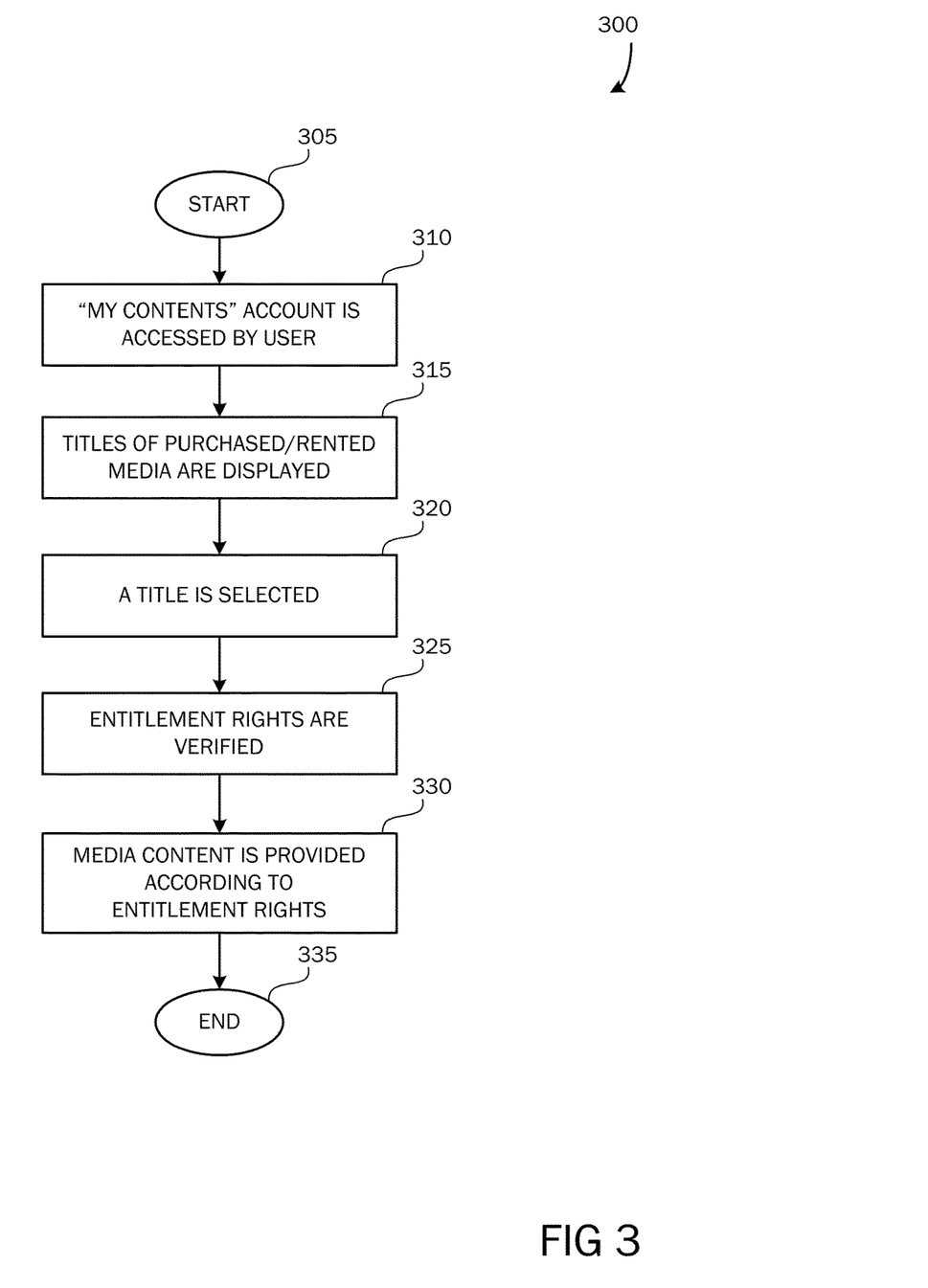
FIG. 3 is a flowchart illustrating an example method of accessing purchased or rented media content via a "My Contents" folder.

Referring now to FIG. 3, a process flow of a method for accessing purchased/rented media 112 via a "My Contents" folder 125 is illustrated. The method starts at OPERATION 305 and proceeds to OPERATION 310 where a user accesses his/her "My Contents" folder 125. According to embodiments, the folder 125 may be accessed via various types of network-connected devices 105,115,140,155. Access to the "My Contents" folder 125 may include entering credential data, such as a user ID and/or password. Alternatively, access to the "My Contents" folder 125 may be granted upon recognition of a registered device 105,115, 140,155 from which the user is accessing the folder.

At OPERATION 315, titles of purchased/rented media content 112 are displayed in a user interface. As was described above, various views may be provided, so that when a user accesses a "My Contents" folder 125, he/she may be able to sort his/her purchases via title, release date, price, ratings, etc. Additionally, a user may group media content 112 based on studio or content provider 145,180, based on genre, or by category (e.g., children, drama, horror, etc.). Other media content associated content may be provided and stored in a "My Contents" folder 125 such as poster arts of titles and extras such as cut scenes, reviews, etc.

At OPERATION 320, a title of a purchased/rented piece of media content 112 may be selected by the user. At OPERATION 325, entitlement rights may be verified. Verifying entitlement rights may include, but is not limited to, verifying that the media content 112 may be accessed by the device 105,115,140,155 that is requesting the content, verifying that the type of access the user is requesting is allowed (e.g., downloading of content vs. streaming), and verifying that a rental period of a rental piece of media content has not expired.

At OPERATION 325, the requested media content 112 may be provided to the requesting device 105,115,140,155 according to the entitlement rights verified at OPERATION 320. According to embodiments, a format suitable to the requesting device may be automatically provided. For example, if a user is trying to watch a movie 112 from a television 160, the user may be automatically provided with the highest format available (e.g., high-definition) unless the user decides to view a lower format version of the media. The method ends at OPERATION 335.

Figure 4:
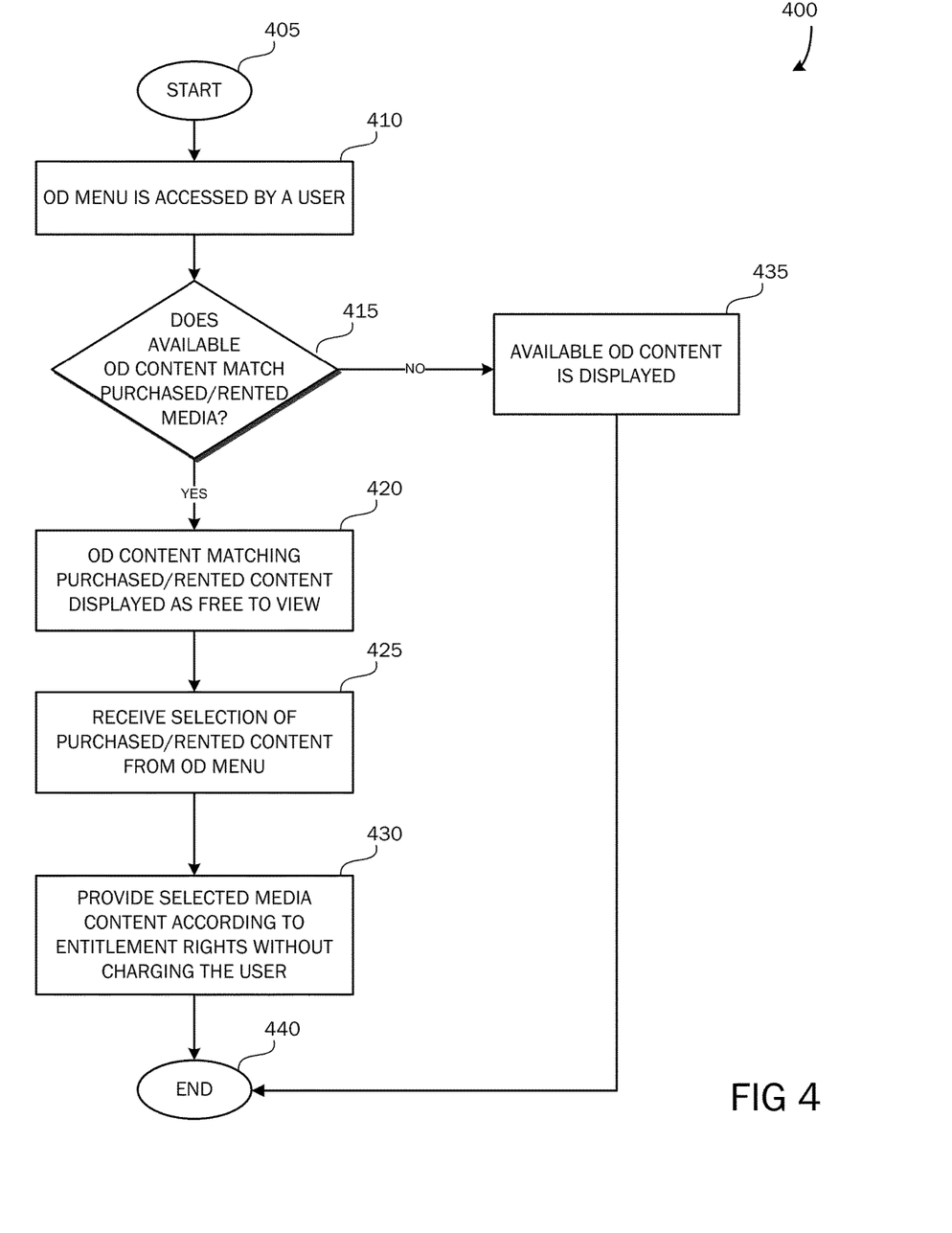
FIG. 4 is a flowchart illustrating an example method of accessing purchased or rented media content via an On Demand menu.

Referring now to FIG. 4, a process flow of a method for accessing purchased/rented media 112 via an On Demand (OD) menu is illustrated. Generally, media content 112 may be purchased or rented from various sources 145,180, and asset ID and entitlement rights and privilege data associated with the purchased/rented media is stored in a folder 125 that is accessible to various devices 105,115,140,155. When a user views media titles of available media 112 through an On Demand menu, a determination is made whether any of the content available through the On Demand menu is content that the user has previously purchased or rented and is stored in the user's "My Contents" folder 125. If there is media available that the user has previously purchased or rented, and if the rights and privileges allow for accessing it, the media content 112 may be provided to the user free of charge.

The method starts at OPERATION 405 and proceeds to OPERATION 410 where an OD menu is accessed by a user. An OD menu may include titles of media 112 that may be available to view, purchase, and/or rent.

At DECISION OPERATION 415, a determination may be made as to whether any of the available media 112 included in the OD menu matches any titles included in the user's "My Contents" folder 125. If none of the available OD media 112 included in the OD menu matches any of the media associated with the user's "My Contents" folder 125, at OPERATION 435, the available OD media titles may be displayed in the OD menu as they would typically be displayed. If there are one or more matches between media 112 available through the OD menu and media associated with the user's "My Contents" folder 125, at OPERATION 420, the matching title(s) of the media content may be displayed to the user as being available to view/access for free. For example, a user may purchase video A 112 through media provider A 180, and the asset ID and entitlement data associated with video A is stored in the user's "My Contents" folder 125. The user may subscribe to a CATV service 145, and may be viewing a Video On Demand menu on his/her television 160 connected to a STB 155. He/she may see video A listed as a movie that is available through his/her CATV services provider. Because he/she has already purchased video A through another provider 180, and the asset ID and entitlement data are stored in his/her "My Contents" folder 125, video A may be listed in the VOD menu, and may include information letting the user know that video A is available to access through the menu and that he/she will not be charged additionally for accessing the video if he/she chooses to select it to watch.

According to another embodiment, if a user has rented a piece of media content 112 from a media provider 145, 180 and later decides to purchase the media through the same or another media provider associated with a "My Contents" folder 125 via any one of his/her registered devices 105, 115,140,155 associated with the folder 125, a discounted price may be provided to the user.

At OPERATION 425, the user selects a previously purchased media title 112 from the OD menu. At OPERATION 430, the user is provided with the media content 112 according to entitlement rights associated with the media content without being charged for the media again. The method ends at OPERATION 440.

Figure 5:
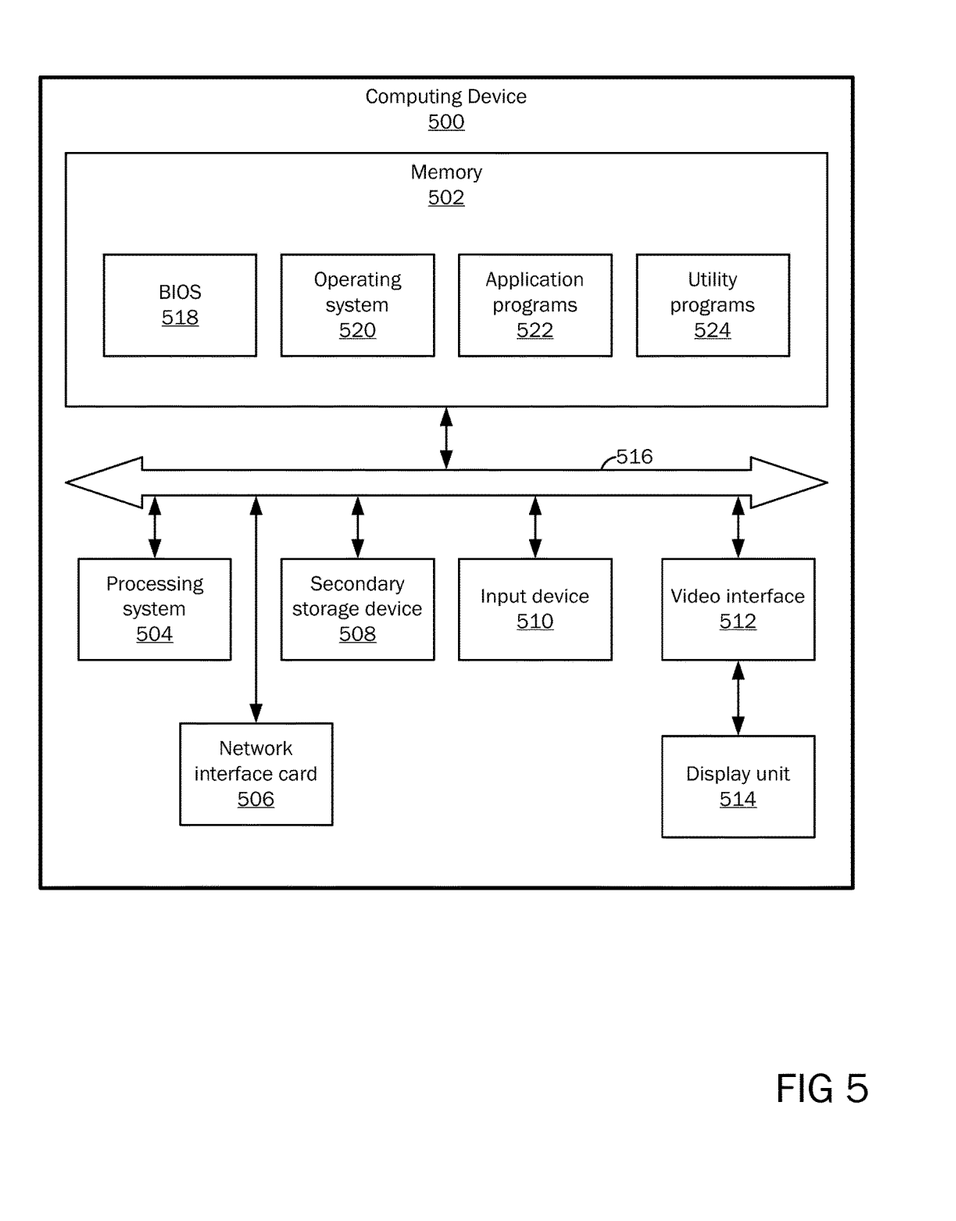
FIG. 5 is a block diagram illustrating a computing device with which embodiments of the present invention may be implemented.

FIG. 5 is a block diagram illustrating an example computing device 500 with which embodiments of the present invention may be implemented. In some embodiments, the "My Contents" folder 125, the user devices 105,115,140, 155, and/or the media provider servers 145,180 are implemented using one or more computing devices like the computing device 500. It should be appreciated that in other embodiments, the "My Contents" folder 125, the user devices 105,115,140,155, and/or the media provider servers 145,180 are implemented using computing devices having hardware components other than those illustrated in the example of FIG. 5.

Computing devices are implemented in different ways in different embodiments. For instance, in the example of FIG. 5, the computing device 500 comprises a memory 502, a processing system 504, a network interface 506, a secondary storage device 508, an input device 510, a video interface 512, a display unit 514, and a communication medium 516. In other embodiments, the computing device 500 is implemented using more or fewer hardware components (e.g., a video interface, a display unit, or an input device).

The memory 502 includes one or more computer-readable storage media capable of storing data and/or computer-executable instructions. In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more Intel Core microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., WiFi, WiMax, etc.), or another type of network interface.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users. The memory 502 also stores one or more utility programs 524 that, when executed by the processing system5, cause the computing device 500 to provide utilities to other software programs.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

As described herein, methods, systems and computer readable media for storing asset ID and entitlement data of purchased and rented media 112 from various sources and allowing access to the stored asset ID and entitlement data from various devices are provided. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A method for maintaining and allowing access to purchased and rented media content, the method comprising:
   receiving a registration of one or more network-connected devices with a media contents account by automatically capturing a unique identification of the one or more network-connected devices upon accessing the media contents account;
   receiving indications of purchases or rentals of media content over a first platform, the first platform accessing the media content via a first network;
   associating the media content with the media contents account;
   receiving asset identification and entitlement data associated with the media content, the entitlement data identifying the one or more network-connected devices that are authorized to access the media content associated with the asset identification;
   storing the asset identification and entitlement data associated with the purchased or rented media content in the media contents account such that the media content previously purchased or rented over the first platform is available from a second platform, the second platform accessing the media content via a second network, the first network and the second network are each selected from a hybrid fiber-coaxial network or a wireless network, and the second network is different from the first network;
   providing an on demand menu on the second platform, the on demand menu having media content available to view, purchase, or rent from a plurality of content providers;
   determining whether any of the media content available in the on demand menu match any of the media content associated with the media contents account;
   indicating the matched media content in the on demand menu as available over the second platform via the media contents account according to the stored asset identification and entitlement data; and
   when the media content becomes no longer available in the on demand menu:
      permitting continued access to the media content over the second platform by streaming the media content to an authorized device from which the request was sent according to the stored asset identification and entitlement data received as a result of having previously purchased or rented the media content over the first platform.

2. The method of claim 1, further comprising providing a user interface displayed on a display of a registered network-connected device whereby a user may view purchased and rented media content whose asset identification and entitlement data are stored in the media contents account.

3. The method of claim 2, further comprising allowing a user to select purchased and rented media content whose asset identification and entitlement data are stored in the media contents account via the user interface displayed on the display of the registered network-connected device.

4. The method of claim 3, further comprising receiving a selection of purchased or rented media content, verifying entitlement rights, and providing the media content to the registered network-connected device according to the entitlement rights.

5. The method of claim 4, wherein providing the media content to the registered network-connected device according to the entitlement rights includes streaming media content to the registered network-connected device.

6. The method of claim 4, wherein providing the media content to the registered network-connected device according to the entitlement rights includes playing downloaded media content on the registered network-connected device.

7. The method of claim 4, further comprising providing the media content to the registered network-connected device in a format suitable for the network-connected device.

8. The method of claim 2, wherein providing a user interface includes providing the On Demand menu including a listing of purchased and rented media content whose asset identification and entitlement data are stored in the media contents account.

9. The method of claim 8, wherein if purchased and rented media content whose asset identification and entitlement data are stored in the media contents account matches On Demand content displayed in the On Demand menu, providing the media content through the On Demand system to the user without additional charge to the user.

10. The method of claim 1, wherein registering one or more network-connected devices with a media contents account includes registering a computer, a set-top box, a mobile device, a gaming device, a television, a DVD player, or a BLU-RAY player with the media contents account.

11. The method of claim 1, further comprising associating a media provider account with the media contents account.

12. The method of claim 1, wherein receiving an indication of a purchase or rental of media content from a media provider includes communication of content in a media provider account with the media contents account.

13. The method of claim 1, further comprising receiving an indication to store media content on a storage medium and associating an asset identification and entitlement data of the media content with the media contents account.

14. The method of claim 1, further comprising receiving an indication to purchase rented media content and providing a discount of a purchase price.

15. The method of claim 1, further comprising synchronizing the media content across the first platform and the second platform in real time, including storing a bookmark allowing access on the second platform to a portion of the media content paused on the first platform.

16. The method of claim 1, wherein the first platform and the second platform are each selected from a web, mobile, or STB type of platform, and the type of platform of the second platform is different from the type of platform of the first platform.

17. A system for maintaining and allowing access to purchased and rented media content, the system comprising:
a media provider server having a processing system, a network interface configured to communicate with a plurality of network-connected devices, and a memory for storing a plurality of media content, a media contents account, and instructions that, when executed by the processing system, cause the media provider server to:
register one or more network-connected devices with the media contents account by automatically capturing a unique identification of the one or more network connected devices upon accessing the media contents account;
receive a request to purchase or rent media content over a first platform, the first platform accessing the media content via a first network;
associate the media content with the media contents account;
provide asset identification and entitlement data associated with the media content, the entitlement data identifying the one or more network-connected devices that are authorized to access the media content associated with the asset identification;
store the asset identification and entitlement data associated with the purchased or rented media content in the media contents account such that the media content purchased or rented over the first platform is available from a second platform, the second platform accessing the media content via a second network, the first network and the second network are each selected from a hybrid fiber-coaxial network or a wireless network, and the second network is different from the first network;
manage network-connected device registration information, asset identification, and entitlement data to enable access to purchased and rented media content from a registered network-connected device;
provide an on demand menu on the second platform, the on demand menu having media content available to view, purchase, or rent from a plurality of content providers;
determine whether any of the media content available in the on demand menu match any of the media content associated with the media contents account;
indicate the matched media content in the on demand menu as available over the second platform via the media contents account according to the stored asset identification and entitlement data; and
when the media content becomes no longer available in the on demand menu:
permit continued access to the media content over the second platform by streaming the media content to an authorized device from which the request was sent according to the stored asset identification and entitlement data.

18. The system of claim 17, wherein the one or more network-connected devices comprise memory for storing downloaded media content.

19. The system of claim 17, wherein the asset identification and entitlement data are provided by a digital rights management system.

20. The system of claim 17, wherein the media contents account is integrated with a service provider billing system.

21. A computer-readable storage device including executable instructions which, when executed by a processor, perform a method for maintaining and allowing access to purchased and rented media content, the method comprising:
receiving a registration of one or more network-connected devices with a media contents account by automatically capturing a unique identification of the one or more network connected devices upon accessing the media contents account;
receiving indications of purchases or rentals of media content over a first platform on a first registered network-connected device, the first platform accessing the media content via a first network;

receiving asset identification and entitlement data associated with the media content, the entitlement data identifying the one or more network-connected devices that are authorized to access the media content associated with the asset identification;

associating the media content with the media contents account;

storing the asset identification and entitlement data associated with the purchased or rented media content in the media contents account such that the media content previously purchased or rented over the first platform is available from a second platform via the media contents account, the second platform accessing the media content via a second network, the first network and the second network are each selected from a hybrid fiber-coaxial network or a wireless network, and the second network is different from the first network;

providing a user interface on a display of a second registered network-connected device for accessing and viewing the purchased and rented media content on the second platform via the media contents account;

providing an on demand menu on the second platform, the on demand menu having media content available to view, purchase, or rent from a plurality of content providers;

determining whether any of the media content available in the on demand menu match any of the media content associated with the media contents account;

indicating the matched media content in the on demand menu as available over the second platform via the media contents account according to the stored asset identification and entitlement data; and when the media content becomes no longer available in the on demand menu:
   permitting continued access to the media content over the second platform by streaming the media content to an authorized device from which the request was sent according to the stored asset identification and entitlement data received as a result of having previously purchased or rented the media content over the first platform.

* * * * *